United States Patent Office 3,199,356
Patented Aug. 10, 1965

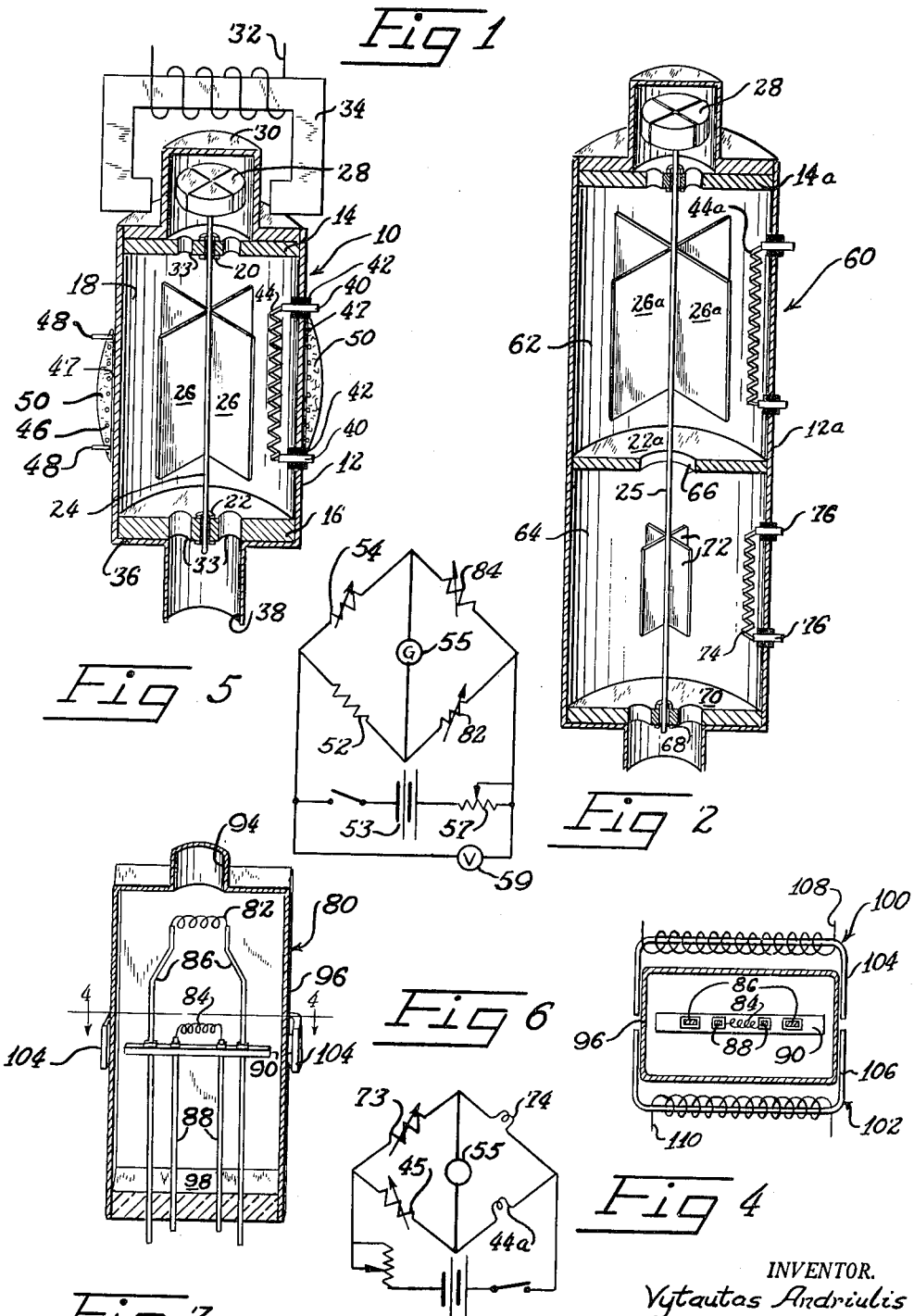

3,199,356
PRESSURE GAUGE
Vytautas Andriulis, 5309 S. Tripp Ave., Chicago, Ill.
Filed Nov. 6, 1961, Ser. No. 150,323
6 Claims. (Cl. 73—399)

This invention pertains to a gauge and, more particularly, relates to a thermal conductivity pressure gauge providing accurate readings over an extremely broad range of pressures and especially subatmospheric pressures.

Vacuum gauges depending upon variations in the thermal activity or agitation of rarefied gas with variations in pressure were heretofore known. The Pirani gauge is an example of such a pressure-measuring device based on the principle that the thermal agitation of a gas is related to its pressure, at very low pressures, substantially in accordance with the formula:

$$K = a.p$$

In the above equation "K" is the thermal conductivity of the gas, "p" is the gas pressure and "a" is a constant determined by the nature of the gas molecule being measured. In the Pirani gauge, the resistance of a heated filament centrally located in an envelope charged with the rarefied atmosphere is measured. As the pressure, and consequently the molecular density, surrounding the filament varies, so does the rate at which heat is dissipated from the filament by the molecules of the surrounding atmosphere vary. This change in cooling effect changes the filament temperature and concomitantly by selecting a filament material having a high thermal coefficient of resistance changes the filament resistance accordingly. The filament resistance changes may be accurately determined by various sensing circuits, such as a Wheatstone bridge arrangement. A numerical indication of the resistance change thus indicates the change in density of the gaseous molecules surrounding the filament.

However, because operation of the Pirani gauge relies upon thermally agitated molecules moving directly from the filament to the envelope, it can only be used to measure very low gaseous densities corresponding to pressures up to about 1.0 millimeter of mercury. Above this pressure the mean-free-path of the gaseous molecules which surround the heated filament is such that collisions therebetween provide a constant heat conductivity value substantially insensitive to further pressure increase.

A thermocouple gauge comprises another means of measuring the response of a thermally responsive vacuum gauge which utilizes the principle that at low pressures, the heat dissipation through a gas is proportional to the gas pressure. In the thermocouple gauge a thermojunction of thin wires of unlike metals is connected to a heater which may comprise a thin platinum ribbon. The thermo-junction is disposed in a housing in communication with the vacuum to be measured.

A small heating current is passed through the platinum heater producing a thermo-E.M.F. in the thermocouple. Since the temperature of the thermo-junction depends upon the degree of thermal molecular activity and hence upon the gas pressure, a galvanometer deflection indicates the gas pressure surrounding the thermo-junction. However, the thermocouple gauge is obviously subject to the same limitation of operability as the Pirani gauge, namely, accuracy at low pressures only.

It is an object of this invention to provide a novel gauge which accurately measures gas pressures over an extremely broad range.

It is a further object of this invention to provide a novel vacuum gauge which may function as a Pirani gauge in the very low pressure range in which the Pirani gauge is effective, and employ a novel forced circulation principle at higher pressures.

It is still another object of this invention to provide a novel thermal conductivity vacuum gauge which is compact and readily placed in operable condition for measuring the pressure of all gases and mixtures thereof for which calibrations have previously been made.

The above and other objects of this invention will become more apparent from the following detailed discussion when read in the light of the accompanying drawing and appended claims.

In one embodiment of this invention, a pressure-sensing resistor, such as a filament of tungsten or platinum, is placed within a measuring housing having walls of high heat conductivity. The housing is adapted to communicate with a vacuum to be measured; the sensing resistor therein comprises one arm of a Wheatstone bridge.

A second resistor is disposed about the periphery of the measuring housing and functions as a balancing resistance adapted for use in a Wheatstone bridge arrangement and is similar in resistance and thermal characteristics to the sensing resistance.

Two other resistors of known value are placed in the bridge arrangement and a constant heating current is supplied to the sensing element. An indication of the change in resistance of the sensing element upon exposure to the gaseous medium under test may be obtained from the bridge giving an indication of the gas pressure present.

According to this invention an impeller is rotatably mounted in the measuring housing having gas-impelling vanes which may be arranged parallel to the sensing filament. In one preferred embodiment the housing is a cylindrical gas-tight envelope with the sensing filament and vanes generally parallel to the envelope axis. A rotor of a synchronous motor attached to the impeller shaft is disposed within the measuring housing and rotatably moves in synchronism with a revolving magnetic field disposed externally of the housing.

At pressures above the very low levels susceptible to measurement by Pirani type gauges, the impeller is motor actuated to uniformly rotate, forcing the heat-conducting gas molecules to the walls of the housing whereat the heat is dissipated. Thus, cooling of the sensing filament is still dependent upon the number of gas molecules present, but independent of the molecular diffusion action relied upon in "Pirani operation" to remove the heat from the sensing filament. The gauge is, therefore, able to accurately record gas pressures over an extremely broad range based on the thermal conductivity of the gaseous matter when positively agitated.

For a more complete understanding of this invention, reference will now be made to the drawing, wherein:

FIGURE 1 is a sectional elevational view of one embodiment of a gauge constructed in accordance with the teaching of this invention;

FIG. 2 is a sectional elevational view of a second embodiment of a gauge constructed in accordance with the teaching of this invention;

FIG. 3 is a sectional elevational view of a gauge construction employing moving sensing resistors made in accordance with the teaching of this invention;

FIG. 4 is a sectional view taken on line 4—4 of FIG. 3;

FIG. 5 is a schematic illustration of a circuit which may be employed in utilizing the illustrated gauge construction of FIG. 3; and FIG. 6 is a schematic illustration of a circuit which may be employed in the course of utilizing the illustrated vacuum gauge construction of FIG. 2.

Referring now to FIG. 1 of the drawing, a vacuum gauge 10 is illustrated which functions in accordance with the principles set forth in the above introductory paragraphs. The gauge comprises a measuring housing wall 12, preferably cylindrical, which is made of a metal having good heat-conductivity, such as brass or copper. Opposed apertured platforms 14 and 16 are arranged in upper and lower ends of measuring chamber 18 defined by wall 12.

Bearings 20 and 22 are centrally disposed in each of the opposed platforms 14 and 16 for purposes of engaging the ends of an elongate shaft 24. Four rectangular blades or vanes 26 are attached to shaft 24 and are peripherally spaced at about 90° intervals. Secured to the upper end of shaft 24 is a rotor 28 forming part of a synchronous motor assembly. The rotor is housed within cap 30 of the gauge 10, which engages the upper edge of the housing wall 12 in a fluid-tight relationship.

Rotor 28 is rotatably driven within cap portion 30 of the gauge by means of a revolving magnetic field generated by an external field coil 32 disposed about core 34. Coil 32 schematically represents the field coil of a synchronous motor which may include a shaded pole, a capacitor winding or several windings supplied with polyphase alternating current. Rotor 28 may thus be driven at a substantially constant speed irrespective of line voltage variations and the like.

The lower end of the gauge 10 comprises a floor 36 which engages the lower edge of the wall 12 in a fluid-tight relationship. Floor 36 also has a central passageway 38, which is adapted to communicate with the gaseous body to be measured. The platforms 14 and 16 in which shaft 24 is rotatably mounted possess a plurality of apertures 33, which enable the gas in the system being measured to diffuse uniformly throughout gauge 10. Thus the bearings 20 and 22 are not necessarily capable of withstanding substantial pressure differentials and are not necessarily fluid-tight.

Traversing wall 12 of the gauge 10 are two spaced electrodes 40. The wall apertures through which the electrodes pass are rendered gas-tight by means of glass-fused bushings 42 or other equivalent electrically nonconductive sealing means.

The electrodes 40 supportably engage an electrical sensing resistor 44, preferably having a substantial positive temperature coefficient of resistance. Suitable resistors may be formed from tungsten or platinum filaments. The filament 44 is preferably arranged parallel with the adjacent wall portion of the gauge 10 and parallel with the blades 26.

Disposed about an outer peripheral portion of the housing 12 which encompasses the filament 44 is a resistance wire 46, which is connected to an appropriate circuit by leads 48. Resistance wire 46 is a part of the bridge circuit and energized from the same source to provide automatic compensation for ambient temperature variations. Resistance wire 46 is laid upon a thin electrically insulating film 47 and is encased by heat insulating band 50. Thus resistance 46 compensates for long term changes in the temperature of the gauge, but is isolated from transient phenomena, such as air movements or rapid changes in ambient temperature of the surrounding atmosphere.

In normal gauge operation, heat generated by the current passed through the resistance wire 46 is dissipated into the housing chamber and the temperature is relatively independent of any fluctuations in the atmosphere surrounding the gauge. The gauge 10 is placed in communication with the vacuum system to be measured through a sealed connection with passageway 38.

In a rarefied atmosphere the gas molecules within the chamber 18 will convey heat from the surface of resistor 44 to the wall 12 of the gauge 10, as a result of normal molecular diffusion. If the molecular concentration is sufficiently high, the heat transfer through the wall 12 will be relatively constant for changes in pressure. As gaseous pressures decrease, fewer heat transferring molecules of the gas will be available and, as a result, the temperature of the sensing resistor 44 will rise producing an increase in the resistance of the filament. The resistance increase may be ascertained by means of a Wheatstone bridge arrangement, such as illustrated in either FIG. 5 or 6, a thermocouple, or any other appropriate sensing means. A known change in the resistance of resistor 44 may be directly translated into a measurement of pressure as a result of a previous calibration.

The functioning of the sensing element 44, above-described, corresponds to the operation of the sensing element of the Pirani gauge based upon thermally excited molecules. The latter gauge, however, is inaccurate at pressures above about one millimeter of mercury. The collisions between gas molecules at pressures in excess of one millimeter of mercury are such that thermal molecular motion between the heated element and the wall of the cavity is substantially independent of the pressure in the system and, accordingly, masses of gas cannot cool the heated sensing resistor 44 in any manner having predictable correlation with gas pressure. Above one millimeter of pressure, the molecular heat conductivity of the gas becomes quite constant.

In a range of pressures above one millimeter Hg, the main mechanism of gaseous cooling usually comprises convection currents whereby gases in the neighborhood of a heated element are warmed and thus expanded to a lesser density than the more remote space within the chamber. The lighter gas thus rises producing circulation within the chamber by gravitational forces. Such a system is inaccurate, insensitive, subject to the geometry of the system and dependent upon the position or orientation of the gauge.

In accordance with this invention, at those pressures above about one millimeter of mercury, the gases in the measuring chamber 18 are forced to circulate from the sensing resistor 44 to the chamber wall 12 by means of the fan blades 26 or equivalent impelling means. The blades 26 are rotatably moved at a constant speed by means of the revolving magnetic field above-described which rotatably drives rotor 28 and shaft 24 to which gas-propelling blades 26 are attached.

The amount of cooling of the sensing resistor 44 accordingly is still proportional to the amount, or the number of gaseous molecules present, although such molecules are forced to engage in heat transfer relationship with the chamber wall 12 as a result of the action of blades 26. The blades 26, therefore, comprise a means for effecting uniform forced circulation of the gas within measuring chamber 18 at those pressures at which the Pirani principle of gas diffusion is no longer workable.

During gauge operation employing forced circulation, the resistor 44 is heated and the change in resistance thereof resulting from the cooling effect of the gas molecules forcibly circulated by the fan blades 26 is an indication of the molecular density and consequently pressure within the chamber 18. The change in resistance of filament 44 may be obtained by means of a Wheatstone bridge arrangement similar to that schematically illustrated in FIG. 5. Resistor 44 may be arranged as one arm of the Wheatstone bridge, as is illustrated resistor 82, and compensating resistor 46 may be arranged as is illustrated resistor 84, as an adjacent arm with two balancing resistors, 52 and 54, having resistances of known value oppositely disposed in the respective bridge arms. By adjusting resistor 54, the bridge is balanced while the gauge is under very high vacuum. Thereafter the unbalanced current of the bridge, as read on galvanometer 55, is an index of the pressure within the chamber. The bridge may be operated with constant current in the sensing arm, with constant total current or with constant voltage to suit the specific equipment and calibration.

In an alternative method, the temperature (and consequently, resistance) of the sensing resistor 44 (positioned similarly to illustrated resistor 82 of FIG. 5) in the bridge arrangement may be maintained constant by varying the applied voltage from source 53 through variations in series resistor 57 or any other convenient means. The change in voltage supplied to maintain such constant resistance may be determined from a voltmeter 59 and employed as an indication of the pressure within the measuring chamber 18.

FIG. 2 discloses a modified vacuum gauge 60 containing superposed measuring chambers 62 and 64, peripherally defined by wall 12a and utilizing the same synchronous motor elements of FIG. 1.

Measuring chamber 62 of gauge 60 is substantially the same as chamber 18 previously described, with the exception that platform 22a has an enlarged central opening 66 to enable passage of elongate rotating shaft 25 and to provide optimum distribution of the gaseous medium within the two chambers. Shaft 25 has the lower end thereof journaled in bearing 68 disposed in platform 70, which defines the lower end of measuring chamber 64.

The shaft 25 has secured thereto upper blades 26a disposed in spaced relationship to sensing resistor 44a in chamber 62 and has attached thereto on a lower portion thereof, blades 72, which are peripherally arranged at 90° intervals on the shaft 25.

In the gauge 60 of FIG. 2, resistor 74 disposed in measuring chamber 64 by means of electrodes 76 functions as a balancing resistance to be used in a Wheatstone bridge arrangement and is preferably similar or identical in resistance and thermal characteristics to resistor 44a in measuring chamber 62.

It will be noted from FIG. 2 that the area of the blades 72 is somewhat less than the area of blades 26a; also, the spacing of resistor 74 from the wall 12a may be different from the spacing of resistor 44a relative to the wall. Accordingly, different though predictable cooling effects will be imparted to the resistors 74 and 44a, providing different changes in resistance upon exposure to varying pressure which may be measured by means of the Wheatstone bridge arrangement of FIG. 6.

Inasmuch as any effect of the ambient conditions about gauge wall 12a will similarly affect heat transfer by the gaseous medium relative to resistors 44a and 74, such effects will cancel out.

In FIG. 6 a Wheatstone bridge arrangement is disclosed depicting an arrangement of the resistors 44a and 74 therein which may be maintained in balance with the assistance of variable resistors 73 and 45.

FIG. 3 discloses a gauge construction 80 in which main sensing resistor 82 and a balancing resistor 84 are maintained on supporting, electrically conducting reeds 86 and 88, respectively. The reeds are forced to move as a unit by interconnecting magnet 90 secured to upper portions of reeds 88 and central portions of reeds 86 in the manner illustrated. The magnet 90 is electrically isolated from reeds 86 and 88.

In the gauge 80, the sensing elements move relative to the gaseous atmosphere which enters the measuring chamber 92 by means of inlet 94 and surrounds resistors 82 and 84. The inlet defines one end of housing 96 which is composed of a metal having good heat conductivity and low magnetic permeability. Floor 98 is oppositely disposed to gas inlet 94 and is formed of an electrically insulating material. In the alternative, the base 98 may be metallic with bushings, such as bushings 42 of FIG. 1 surrounding each conductor 86 and 88. The floor 98 provides a mounting base for the reeds 86 and 88 while engaging the same in fluid-tight relationship and also engaging the lower edge of wall 96 in a similar fluid-tight engagement.

The sensing elements 82 and 84 are vibrated in chamber 92 by means of electro-magnets 100 and 102, illustrated in FIG. 4. The electro-magnets possess cores 104 and 106, respectively, about which are wound coils 108 and 110 which may be energized from any appropriate periodic source. Conventional 60 cycle A.C. power is appropriate. The polarity of the electro-magnets 100 and 102 changes with each half cycle, whereby magnet 90 is alternatively repelled and attracted by the electro-magnets.

The movement of the sensing elements through the gaseous atmosphere in the chamber 92 provides the necessary relative movement between the sensing resistor and the gaseous medium whereby heat transfer is expedited. Utilizing the resistors 82 and 84 which are similar or identical in resistance and thermal characteristics, the effects of the ambient atmosphere are minimized in the manner previously discussed with reference to FIG. 2.

Any means for creating a constant motion of the resistors 82 and 84 in the chamber 92 may be employed, such as a D.C. field utilizing an interrupter. Also, a sensing resistor may be disposed in a measuring chamber and a D.C. current passed therethrough. If straddled by an alternating-current magnetic field the sensing resistor would be forced to vibrate in synchronism with the magnetic field. The resistors 82 and 84 will be uniformly exposed to all of the spurious variables, such as changes in ambient temperature, filament aging, and the like. However, because of the longer supports 86 upon which filament 82 is mounted, that filament will have greater heat transfer ability as compared with filament 84. Thus, the variable which is indicative of gas pressure is isolated and employed in gauging.

Changes in the resistance of the sensing resistors 82 and 84 of the gauge 80 may be readily ascertained by means such as the Wheatstone bridge of FIG. 5. In the latter figure a Wheatstone bridge is disclosed depicting an arrangement of sensing resistor 82 and balancing resistor 84 which may be maintained in balance with the assistance of resistors 54 and 52. The galvanometer 55, by indicating the subsequent unbalance of the bridge as a result of the variance in cooling of the resistors, provides an index of the pressure within gauge 80.

In an alternative method, the temperature, and therefore the resistance, of the resistor 82 in the bridge arrangement of FIG. 5 may be maintained constant by varying the applied voltage from source 53 through variations in series resistor 57 or equivalent means.

As a further alternative, voltmeter 59 may be employed to indicate the change in voltage, and as a result the pressure in gauge 80, as the resistance of the sensing resistor is rendered constant. The latter alternative methods have been above described with reference to gauge 10 of FIG. 1.

It is seen, therefore, that novel gauge constructions have been presented in which accurate readings may be made at gaseous pressures over an extreme range including super-atmospheric pressures, by causing relative movement between sensing resistors and the gaseous medium being measured. Such relative movement may be created in a number of ways. The sensing elements may move relative to the gaseous medium or the gaseous medium may be forced to move relative to the sensing elements. The principles of the gauge constructions may be embodied in a number of practical applications, such as altimeter constructions, leak detectors, gas analyzers, etc. By appropriate calibration, the pressures being sensed in the latter applications may be directly read on a dial indicator. In use as an altimeter, for example, the associated circuitry is merely calibrated for much higher accuracy than is usual in laboratory gauges. Also, the indicator is easily readable, calibrated in altitude, and adapted to the specific pressure range.

Although it has been suggested that the atmosphere-impelling fans are not necessary at low pressures below one millimeter of mercury, obviously such fans may be employed regardless of the nature of the vacuum being measured. Accordingly, the gauges may be calibrated either with fan operation and/or as a Pirani gauge without fan operation for measuring those pressures below one millimeter of mercury.

Inasmuch as the heat loss of the filament is determined by the nature of the gas molecule being measured, the gauge can only be accurately calibrated for particular gases. It is important, therefore, to avoid the introduction of contaminants such as excessive water vapor when measuring air pressures, unless the calibration is carefully adjusted for this additional variable.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a device for measuring pressure within a gaseous body, the combination comprising; a housing defining a measuring chamber and having walls of high thermal conductivity; means for effecting fluid communication between the interior of said body and the measuring chamber; a temperature-variable sensing resistor having a predetermined temperature coefficient of resistance disposed within said chamber; a spaced, temperature-variable, balancing resistor having a temperature coefficient of resistance similar to said sensing resistor also disposed in said chamber; means for producing relative movement between said resistors and the gas in the measuring chamber, the gas and said sensing resistors having a relative velocity different from the relative velocity of said gas and the balancing resistor; and circuit means including said resistors and a power source for measuring the relative changes in the resistances of said sensing resistor and said balancing resistor due to the thermal conductivity of the gas in said measuring chamber which in turn relates to the pressure encountered in said gaseous body.

2. The device of claim 1 in which said circuit means includes means cooperating with said power source for applying constant current conditions to said resistors while said resistors are moving relative to the gas.

3. The device of claim 1 in which said circuit means includes means cooperating with said power source for effecting constant voltage conditions across said resistors while said resistors are moving relative to the gas whereby the gaseous pressure may be determined by measuring the change in current passing through said vacuum-sensing resistors.

4. The device of claim 1 in which said circuit means includes means cooperating with said power source for maintaining the resistances of said resistors constant while said resistors are exposed to said gas whereby the gaseous pressure may be determined by measuring the changes in voltage impressed across said vacuum-sensing resistors.

5. In a device of the character described the combination comprising a measuring chamber in communication with a gaseous body, the pressure of which is to be determined; said chamber having walls of high thermal conductivity and having communicating first and second zones, electrical current-carrying, temperature-variable resistors having similar resistances and thermal characteristics disposed in each of said zones, means for moving gaseous particles in different degrees between the vicinity of said respective resistors and said chamber walls, and circuit means having a power source connected to said resistors for measuring the relative changes in the resistances thereof whereby the thermal dissipation of the gaseous molecules movably surrounding the resistors indicative of said pressure may be determined.

6. The device of claim 5 in which said means for measuring the relative changes in the resistances of said resistors comprises a Wheatstone bridge in which said resistors comprise arms.

References Cited by the Examiner

UNITED STATES PATENTS

| 1,126,233 | 1/15 | Langmuir | 73—399 |
| 1,668,106 | 5/28 | Dallenbach | 73—399 |
| 2,865,203 | 12/58 | Gruber | 73—399 |

FOREIGN PATENTS

| 827,311 | 2/60 | Great Britain. |

LOUIS R. PRINCE, *Primary Examiner.*

ROBERT L. EVANS, RICHARD C. QUEISSER,
*Examiners.*